(12) United States Patent
Takamiya et al.

(10) Patent No.: US 8,171,254 B2
(45) Date of Patent: May 1, 2012

(54) MEMORY CONTROLLER AND MEMORY CONTROL METHOD

(75) Inventors: Takeshi Takamiya, Iruma (JP); Yoshimasa Aoyama, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/011,761

(22) Filed: Jan. 21, 2011

(65) Prior Publication Data

US 2011/0191566 A1     Aug. 4, 2011

(30) Foreign Application Priority Data

Jan. 29, 2010   (JP) .................... 2010-019223

(51) Int. Cl.
*G06F 13/00*     (2006.01)

(52) U.S. Cl. ................ 711/206; 711/E12.009; 711/202; 707/813

(58) Field of Classification Search .................. 711/206, 711/E12.009; 707/813

See application file for complete search history.

(56) References Cited

U.S. PATENT DOCUMENTS

| 7,173,852 B2 * | 2/2007 | Gorobets et al. | 365/185.09 |
| 2005/0166005 A1 | 7/2005 | Nagano et al. | |
| 2007/0033331 A1 | 2/2007 | Sinclair et al. | |
| 2008/0235467 A1 | 9/2008 | Tagawa | |
| 2010/0037009 A1 * | 2/2010 | Yano et al. | 711/103 |

FOREIGN PATENT DOCUMENTS

| JP | 06-175917 A | 6/1994 |
| JP | 07-036759 A | 2/1995 |
| JP | 2003-058417 A | 2/2003 |
| JP | 2008-146253 A | 6/2008 |
| JP | 2008-242503 A | 10/2008 |
| JP | 2009-503745 A | 1/2009 |
| WO | WO 03/017108 A1 | 2/2003 |
| WO | WO 2004/077447 | 9/2004 |
| WO | WO 2005/029311 A1 | 3/2005 |
| WO | WO 2007/019217 A1 | 2/2007 |

* cited by examiner

*Primary Examiner* — Hetul Patel
(74) *Attorney, Agent, or Firm* — Knobbe, Martens, Olson & Bear, LLP

(57) ABSTRACT

According to one embodiment, a memory controller comprises a counter and a setting module. The counter is configured to count the number of valid pages in a block includes a page to be invalidated, when data is written in a nonvolatile memory. The setting module is configured to set the block as an object of compaction when the number of valid pages counted by the counter is smaller than a predetermined number.

9 Claims, 4 Drawing Sheets

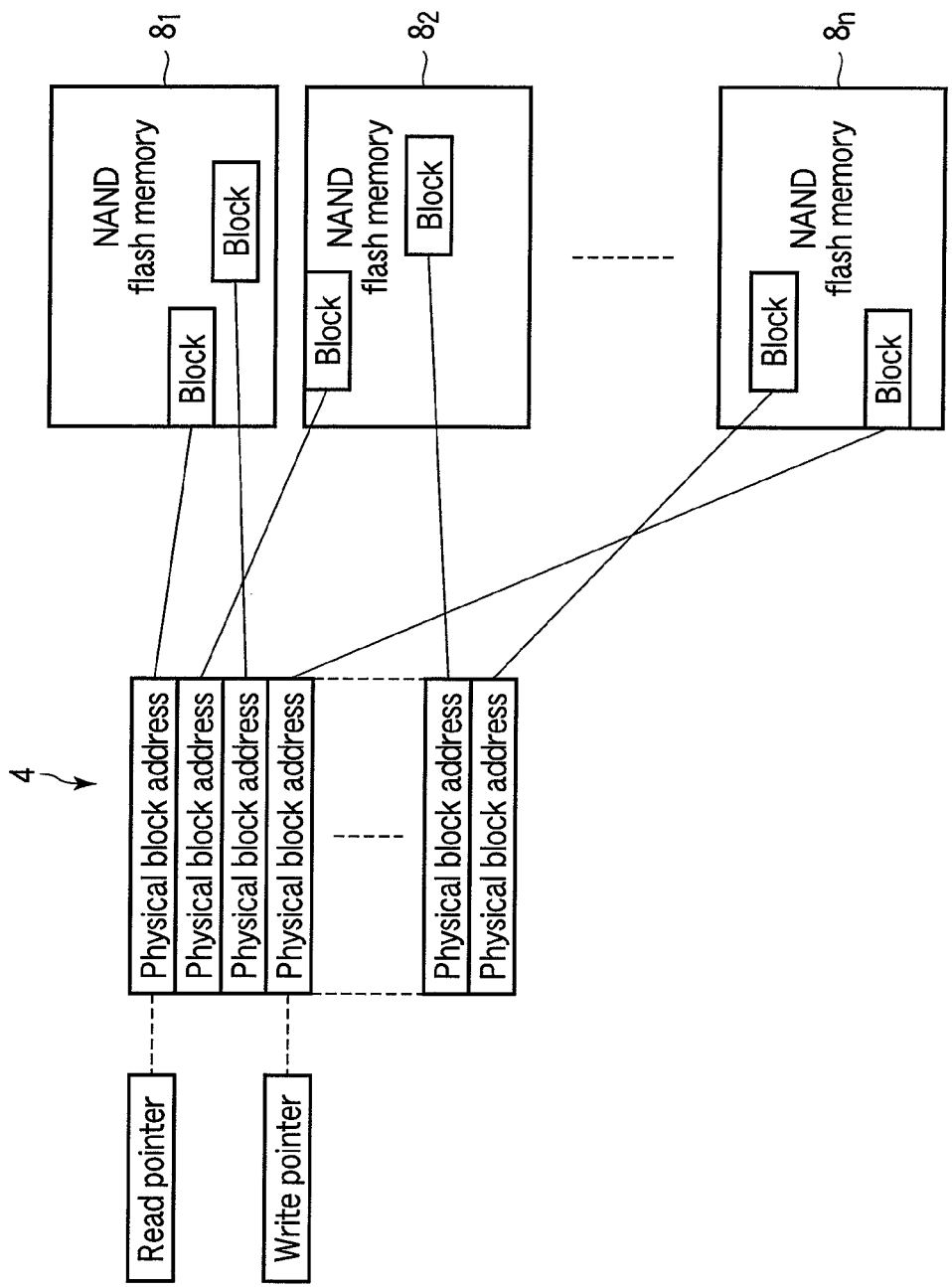
F I G. 3

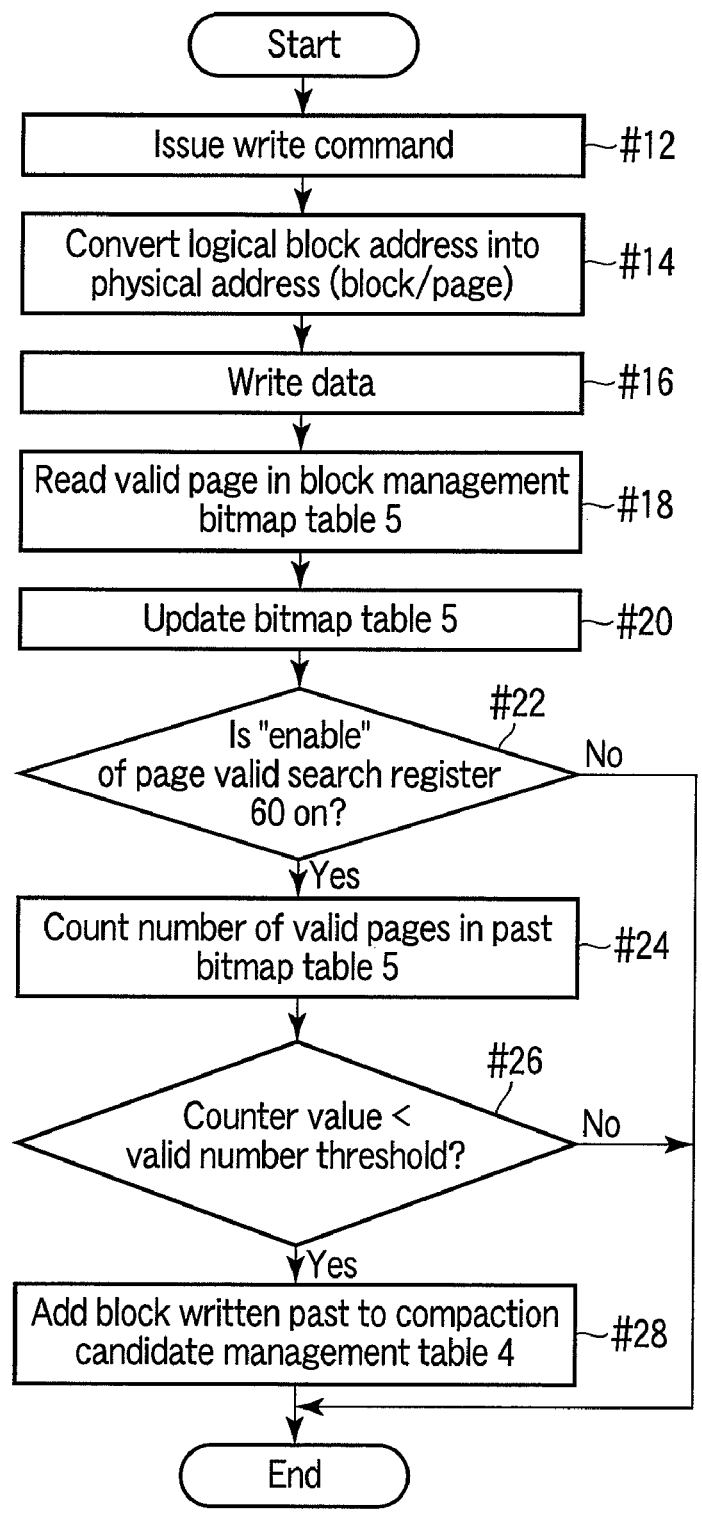
F I G. 5

MEMORY CONTROLLER AND MEMORY CONTROL METHOD

CROSS-REFERENCE TO RELATED APPLICATIONS

This application is based upon and claims the benefit of priority from Japanese Patent Application No. 2010-019223, filed Jan. 29, 2010; the entire contents of which are incorporated herein by reference.

FIELD

Embodiments described herein relate generally to a controller of a nonvolatile memory, and a memory control method.

BACKGROUND

Generally, a nonvolatile memory such as a flash memory is configured to write data to another physical area or erase data, while leaving existing data. Thus, if data writing and erasing are repeated, a divided unwanted area remains, and a used area for storing data is kept divided. An operation to erase an unwanted area and collect a used area is called compaction or garbage collection. Garbage collection in a conventional semiconductor memory device is disclosed in Republished Jpn. PCT National Publication No. WO2004/077447, for example.

After data writing or invalidating, management data is updated, and a used ratio of flash memory is calculated. Necessity of garbage collection is determined according to the calculated used ratio, and garbage collection is performed if necessary. Garbage collection takes a relatively long time, and if user data is accessed during garbage collection, the access time becomes longer time than usual. This problem can be solved by making garbage collection at a different timing from accessing user data in a flash memory. For this purpose, the device disclosed in Republished Jpn. PCT National Publication No. WO2004/077447 provides a flash memory, which can inform an external unit of the timing to erase unnecessary data, like garbage collection. A used ratio calculator determines the state of a flag area, determines the state of a user area, calculates the invalid ratio of user area, and sends the calculated ratio to a controller. A controller receives the ratio, and outputs it to an external unit immediately after data writing or invalidating. A controller of a flash memory receives a write command, writes data in a specified user area, and writes a value indicating the validity of the data in a corresponding flag area. Then, the ratio calculator determines the state of a flag area, and calculates the invalid ratio of a user area. The controller receives the ratio calculated by the ratio calculator, and outputs it to a data bus to notify it to an external unit.

An operation delay caused by garbage collection raises other problems. To prepare for garbage collection, firmware has to periodically and uniquely request hardware to retrieve a block or an object of garbage collection.

Conventionally, access to a main memory is temporarily increased due to the retrieval, and a transfer bandwidth of a main memory is consumed. This interrupts an access to a main memory associated with transfer of user data between a flash memory and a main memory, and decreases an operation speed.

In the semiconductor memory device disclosed in Republished Jpn. PCT National Publication No. WO2004/077447, a flash memory chip memory cell stores table information called a "flag area" for determining the valid number of blocks in a chip. The table must be accessed (access to a flash memory) when retrieving a candidate for garbage collection. A flash memory chip itself determines a block for garbage collection, and garbage collection can be performed for each chip.

A conventional nonvolatile memory controller has another problem that the rate to access a main memory is decreased by retrieving a block as a candidate for compaction.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 3 is an exemplary diagram showing the relationship between a compaction candidate management table and a corresponding block in a NAND flash memory.

FIG. 5 is an exemplary flowchart of operations of a NAND flash memory interface.

DETAILED DESCRIPTION

Various embodiments will be described hereinafter with reference to the accompanying drawings.

In general, according to one embodiment, a memory controller comprises a counter and a setting module. The counter is configured to count the number of valid pages in a block comprising a page to be invalidated, when data is written in a nonvolatile memory. The setting module is configured to set the block as an object of compaction when the number of valid pages counted by the counter is smaller than a predetermined number.

Figure 1:
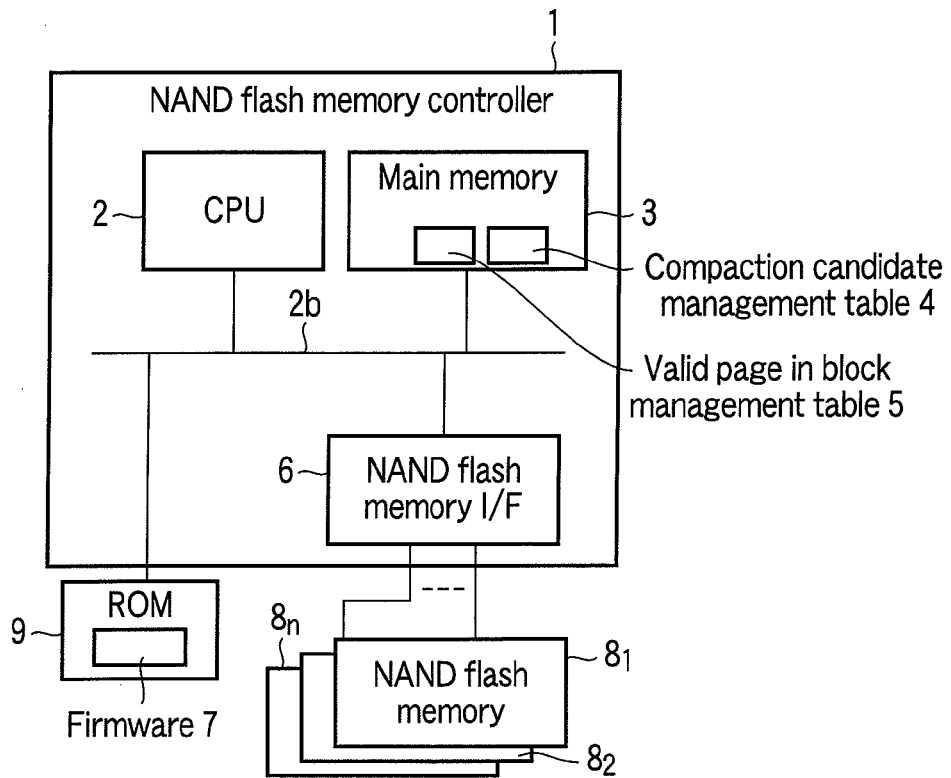
FIG. 1 is an exemplary block diagram of a semiconductor memory device according to an embodiment.

FIG. 1 is a block diagram of a semiconductor memory device according to an embodiment. The semiconductor memory device includes plural nonvolatile memories, such as NAND flash memories $8_1, 8_2, \ldots, 8_n$. NAND flash memories $8_1, 8_2, \ldots, 8_n$ constitute a memory of a semiconductor drive (solid-state drive [SSD]), for example. Each of NAND flash memories $8_1, 8_2, \ldots, 8_n$ comprises 2 to 16 memory chips, for example. NAND flash memories $8_1, 8_2, \ldots, 8_n$ $8_1$, are connected to a NAND flash memory controller 1. The NAND flash memory controller 1 comprises a CPU 2, a main memory 3, and a NAND flash memory interface 6, which are connected via a memory access bus $2b$. The NAND flash memory interface 6 is connected to NAND flash memories $8_1$, $8_2, \ldots, 8_n$, and controls an access to NAND flash memories $8_1, 8_2, \ldots, 8_n$. The main memory 3 comprises a RAM, for example, and includes a valid page in block management bitmap table 5 and a compaction candidate management table 4.

An external ROM 9 is connected to the memory access bus $2b$ of the NAND flash memory controller 1. The ROM 9 includes firmware 7. The firmware 7 uses the CPU 2, and issues a read command and a write command to NAND flash memories $8_1, 8_2, \ldots, 8_n$ by an I/O command access to the NAND flash memory interface 6.

The NAND flash memory interface 6 receives a command from the CPU 2, and transfers data between NAND flash memories $8_1, 8_2, \ldots, 8_n$ and main memory 3.

The firmware 7 is adapted to operate in such a manner that the contents programmed in the ROM 9 are transferred to a temporary memory in the CPU 2 or the main memory 3 at the time of switching on the system power supply.

Figure 2:
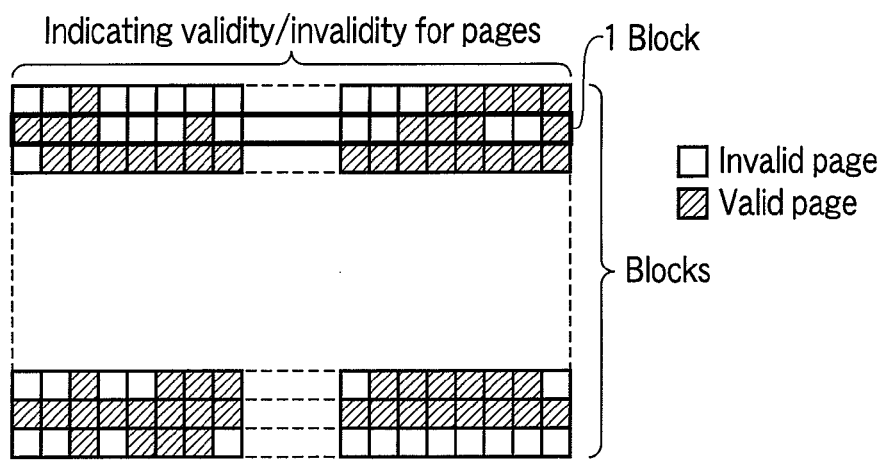
FIG. 2 is an exemplary diagram showing a valid page management bitmap table for compaction search.

The in-block valid page management bitmap table 5 is configured, as shown in FIG. 2, in the form of a bitmap to indicate whether each page of the NAND flash memories $8_1, 8_2, \ldots, 8_n$ is valid or invalid. The whole of the NAND flash memories $10_1, 10_2, \ldots, 10_n$ is divided into a predetermined number of bytes, say, 2,112 bytes each forming one page, so that a predetermined number of pages or 64 pages, for example, make up one block. The term "valid" means that there exists data written in a page in valid form. The term "invalid", on the other hand, means that nothing is written in a page or the data previously written in the page is invalidated (the latest data of the same LBA is written).

When data is written in NAND flash memories $8_1, 8_2, \ldots, 8_n$, the validity of the valid page in block management bitmap table 5 is updated. The firmware writes data by using a logical block address. Therefore, when data is actually written in NAND flash memories $8_1, 8_2, \ldots, 8_n$, a logical block address is converted into a physical address (a block address, or a page address).

When data is written in the same cell, the life of an internal cell of NAND flash memories $8_1, 8_2, \ldots, 8_n$ is extremely reduced. To prevent the reduction of life, the firmware 7 and NAND flash memory interface 6 write data in a page at a physical address different from the address used for past writing, and invalidate the data stored in the page at the physical address storing past data, even when writing data two or more times at the same logical block address. The valid page in block management bitmap table 5 is used for this validity management. Therefore, as the system is operating while writing data, it is indispensable to encounter with a block having few valid pages (a block subjected to compaction).

Conventionally, the firmware 7 uniquely counts the number of valid pages in a block, and enters a block having the number of valid pages less than a certain number as an object of compaction, and subjects it to compaction. Compaction is an operation to collect valid page data of two or more blocks, move it to another block, invalidate a source page, and produce a blank block with no data written. The compaction candidate management table 4 is used for this purpose.

Several kinds of block can be used as a candidate for compaction. In such blocks, the valid page ratio is low, an error frequently occurs, or only reading is repeated by predetermined times. The embodiment improves the efficiency of retrieving a candidate for compaction, when the valid page ratio is decreased.

Conventionally, exclusive hardware is used to count the number of valid pages in a block in the valid page in block management bitmap table 5. The firmware 7 retrieves and specifies a candidate for compaction by periodically or uniquely operating the hardware, and adds the candidate to the compaction candidate management table 4. Thus, an access to the main memory 3 necessary for the retrieving is temporarily concentrated, interrupts the memory access necessary for transferring data with NAND flash memories $8_1, 8_2, \ldots, 8_n$, and decreases the data transfer rate for the user.

In the embodiment, when data writing is completed, the valid page in block management bitmap table 5 is updated, and the number of valid pages in a block to be invalidated (a physical block with data written in the past at the same logical block address). If the number of pages is less than a preset number, the physical block with the data written in the past is added to the compaction candidate management table 4 as a candidate for compaction. A candidate for compaction activated by the firmware 7 may occur, when the number of candidates stored in the compaction candidate table 4 is decreased to less than a certain number. However, in the embodiment, a candidate for compaction can be almost automatically added to the compaction candidate management table 4 by the hardware, when data writing is completed, and the number of requests to retrieve a candidate for compaction activated by the firmware 7 can be decreased. Therefore, concentration of an access to the main memory 3 for retrieving a candidate for compaction is relieved, and the memory access necessary for transferring data between the main memory 3 and NAND flash memory memories $8_1, 8_2, \ldots, 8_n$ is not interrupted, and the data transfer rate is not decreased.

FIG. 3 a diagram showing the relationship between the compaction candidate management table 4 and corresponding blocks in NAND flash memories $8_1, 8_2, \ldots, 8_n$. The compaction candidate management table 4 is managed mainly by the firmware 7, and assumes a queue (FIFO) structure in the example shown in the drawing. Therefore, a first value of a physical block address in NAND flash memories $8_1, 8_2, \ldots, 8_n$ is assumed to be a queue data, and a read pointer (RP) and a write pointer (WP) are provided. Data is written in a queue at an address indicated by the write pointer. When compaction is executed, a physical block address stored in a queue indicated by the read pointer is used as an object block address. Operations of these pointers are the same as those of ordinary queue operations.

Figure 4:
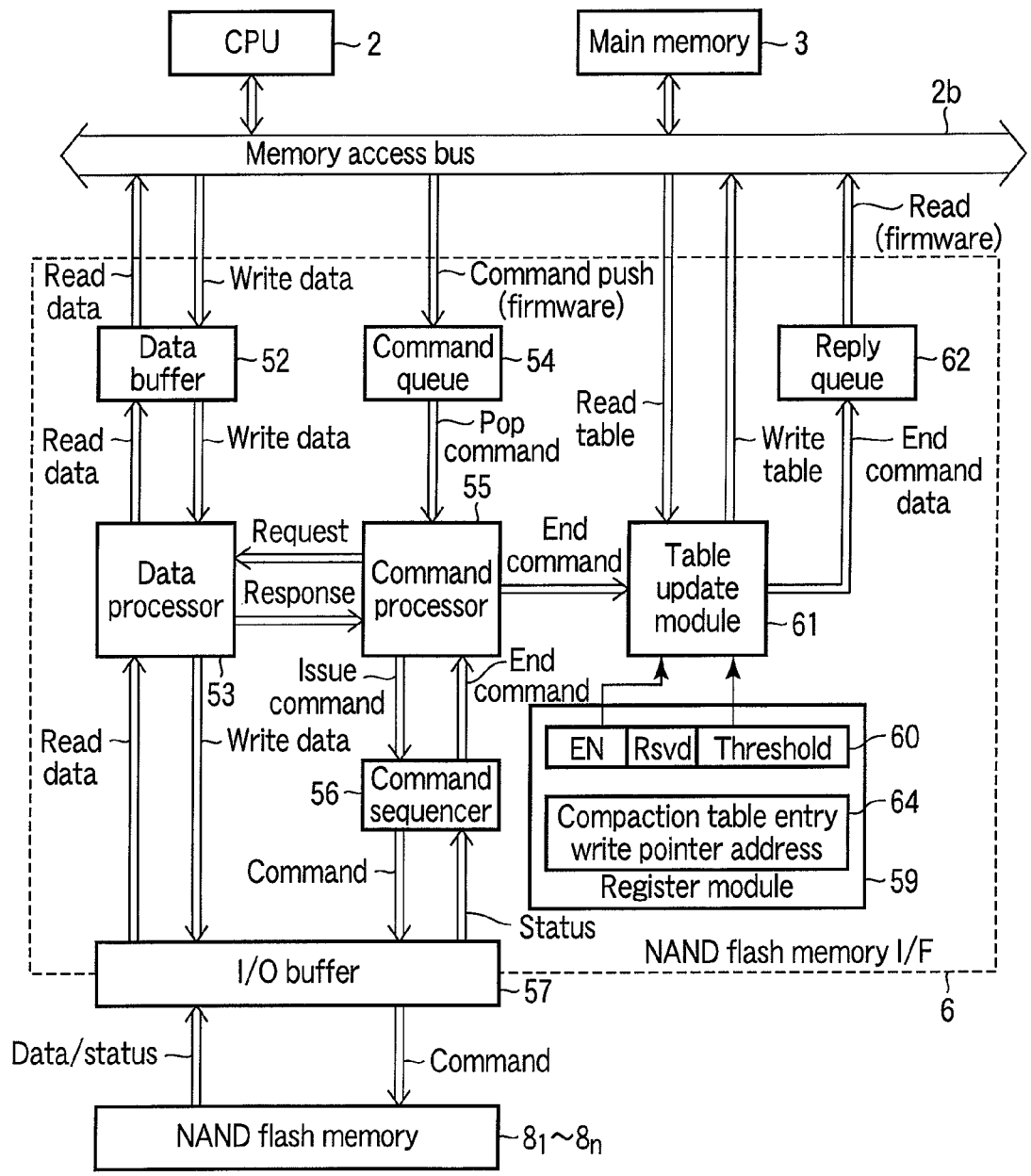
FIG. 4 is an exemplary block diagram showing a configuration of a NAND flash memory interface.

FIG. 4 is a block diagram showing a detailed configuration of the NAND flash memory interface 6. A memory access bus $2b$ is an internal bus for accessing the NAND flash memory interface 6 from the CPU 2, or to access the main memory 3 from the NAND flash memory interface 6.

The NAND flash memories $8_1, 8_2, \ldots, 8_n$ are accessed through an I/O buffer 57. Write data from the memory access bus $2b$ is supplied to a data buffer 52, and supplied to an I/O buffer 57 through a data processor 53. Read data from the I/O buffer 57 is supplied to the memory access bus $2b$ through the data processor 53 and data buffer 52. The I/O buffer 57 and NAND flash memories $8_1, 8_2, \ldots, 8_n$ are connected by a data/status and a command.

Read command and write command from the CPU 2 are written in a command queue 54 through the memory access bus $2b$ (pushed by the firmware). The command format may be a bit format easy to be processed by the NAND flash memory interface 6, depending on hardware implementation. When a command is written in the command queue 54, a command processor 55 takes out the entered command from the command queue 54, and activates it by issuing a command to a command sequencer 56.

The command sequencer 56 accesses the NAND flash memories $8_1, 8_2, \ldots, 8_n$. When accessing the NAND flash memories $8_1, 8_2, \ldots, 8_n$, the command sequencer 56 sends a data transfer request to the data processor 53. When the data transfer is completed, the data processor 53 returns an end response to the command sequencer 56. The command sequencer 56 sends an end command to the command processor 55. The command processor 55 sends the end command to a table update engine 61.

The table update engine 61 is a module to update a table in the main memory 3 associated with the ended command, which updates the function of searching a valid page in a candidate block for compaction, the valid page in block management bitmap table 5 at the end of writing, and other management tables. As this is not related to the essential characteristics of the embodiment, an explanation of updating is omitted, except for updating of the valid page in block management bitmap table 5. After completing all processing, the table update engine 61 pushes an end command data to a reply queue 62. This completes processing of command by the hardware.

The firmware 7 confirms the result of execution of command by reading the reply queue 62.

A register module 59 is a module for setting the NAND flash memory interface 6, and storing various data from the CPU 2. The register module 59 includes a page efficacy search register 60, and a compaction table entry rewrite pointer address register 64. The page efficacy search register 60 sends the table update engine 61 an enable (EN) to determine whether to count valid pages at the end of writing, and a valid number threshold value of a candidate for compaction.

FIG. 5 is a flowchart of write operations of the embodiment.

A write command is issued in step #12, and a logical block address (LBA) or an object of a write command is converted into a physical address (block/page) in step #14. In step #16, data is written in NAND flash memories $8_1, 8_2, \ldots, 8_n$ based on the converted physical address. After the data is written, in step #18, the table update engine 61 reads the valid page in block management bitmap table 5 stored in the main memory 3. In step #20, the table update engine 61 updates the bitmap table 5 as follows. In other words, the table update engine 61 validates a corresponding page in a physical block or an object of writing this time, and invalidates a corresponding page in a physical block or an object of past writing, which corresponds to a logical block or an object of writing this time.

In step #22, it is determined whether the enable of the page efficacy search register 60 is on. In step #24, when the enable is on, the number of valid pages in a page field of a physical block or an object of past writing is counted based on the updated valid page in block management bitmap table 5. In step #26, the counted value is compared with a valid number threshold value.

In step #28, when the counted value is lower than the valid number threshold, or when the number of valid pages in the physical block or an object of past writing is small, the block is added to the compaction candidate management table 4 as a candidate for compaction.

As described above, since the compaction candidate management table 4 uses a queue structure, the hardware must know the write pointer of the table 4 to enter (add as a candidate for compaction) in the table 4. For this purpose, the compaction table entry rewrite pointer address register 64 indicating the address is provided in the register module 59. Write pointer data can be obtained by directly accessing the main memory 3 storing the write pointer by using an address set in the write pointer address register 64.

As explained above, according to the embodiment, after data is written in flash memories $8_1, 8_2, \ldots, 8_n$, the valid page in block management bitmap table 5 is updated. The number of valid pages in a past physical block with data written in the past corresponding to a logical block address of an object of writing this time is counted based on the updated table 5. When the counted number of valid pages is smaller than a predetermined number, the past physical block is added to the compaction candidate management table 4 as a candidate for compaction.

Thus, accompanying ordinary data writing, setting of a candidate for compaction is automatically executed simultaneously with a part of retrieving a candidate for compaction.

Therefore, a request to retrieve a block or a candidate for periodical compaction, which is required by a conventional firmware, becomes unnecessary. By decreasing the number of retrievals activated by the firmware as described above, the temporarily increased ratio of using a bandwidth in the main memory is decreased, the access to the main memory associated with the transfer of user data with NAND flash memories is not interrupted, and the operation speed is not decreased.

The compaction candidate management table 4 is not limited to a queue structure. For example, if a data chain structure is adopted, a candidate for compaction may be additionally entered at an address of a pointer holding final chain data.

The embodiment is applicable to any system using the NAND flash memory controller 1. For example, the embodiment is applicable to a device called a semiconductor drive (solid-state drive [SSD]), a silicon audio device, and a memory media card. In such a case, it is necessary to add a host bus peculiar to a system to the components disclosed in the embodiment. If the embodiment is applied to an SSD, it is necessary to add an SAS/SATA host bus interface.

According to the embodiment, there is provided a nonvolatile memory controller, in which retrieval of a candidate block for compaction does not affect the speed of accessing a main memory, and a nonvolatile memory control method.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory controller for a nonvolatile memory, the controller comprising:
   a counter configured to count a number of valid pages in a block comprising a page to be disabled upon writing, when data is written in the nonvolatile memory;
   an adding module configured to set the block as an object of compaction when the number of valid pages counted by the counter is smaller than a threshold number; and
   a compaction candidate management table configured to store an information indicating an object block of compaction by the adding module,
   wherein the compaction candidate management table is accessible from hardware and firmware.

2. The controller of claim 1, further comprising:
   a valid page management table configured to manage validity or invalidity of data in the nonvolatile memory for each page, wherein
   the counter is configured to enable a page to which data is written based on a logical block address of a write object and to disable a page to which data was written based on the logical block address of the write object, when data is written in order to update the valid page management table.

3. The controller of claim 1, wherein the adding module comprises a register configured to store the threshold number.

4. A memory controller for a nonvolatile memory, the controller comprising:
- a valid page management table configured to manage validity or invalidity of data in the nonvolatile memory for each page comprising bytes;
- a compaction candidate management table configured to store an information indicating a candidate for compaction for each block comprising pages;
- a write module configured to write data in the nonvolatile memory with converting a logical block address of a write object into a physical block address;
- an update module configured to update the valid page management table after the write module writes the data in the nonvolatile memory;
- a counter configured to count a number of valid pages in a first physical block to which data was written based on the logical block address of the write object, based on the updated valid page management table; and
- an adding module configured to add an address of the first physical block to the compaction candidate management table when the number of valid pages counted by the counter is smaller than a threshold number.

5. The controller of claim 4, wherein the update module is configured to enable a physical block for current data writing which is converted from the logical block address of the write object and to disable a physical block for past data writing which is converted from the logical block address of the write object.

6. The controller of claim 4, further comprising a register configured to store the threshold number.

7. The controller of claim 4, wherein the compaction candidate management table is accessible from both hardware and firmware.

8. A control method for a nonvolatile memory, the method comprising:
- writing data in the nonvolatile memory with converting a logical block address of a write object into a physical block address;
- updating a valid page management table configured to manage validity or invalidity of data in the nonvolatile memory for each page comprising bytes, after data is written in the nonvolatile memory;
- counting a number of valid pages in a first physical block to which data was written based on the logical block address of the write object, based on the updated valid page management table; and
- adding an address of the first physical block to a compaction candidate management table configured to store an information indicating a candidate for compaction of the nonvolatile memory for each block comprising pages.

9. The method of claim 8, wherein the updating comprises:
- enabling a physical block for current data writing which is converted from the logical block address of the write object; and
- disabling a physical block for past data writing which is converted from the logical block address of the write object.

* * * * *